(12) United States Patent
Vellmar

(10) Patent No.: US 9,919,174 B2
(45) Date of Patent: Mar. 20, 2018

(54) AQUEOUS COMPOSITION COMPRISING PHOSPHOROUS AND NITROGEN FOR GENERAL FIRE CONTROL

(71) Applicant: FLAME SECURITY SWEDEN AB, Skogås (SE)

(72) Inventor: Ulf Vellmar, Södra Sandby (SE)

(73) Assignee: FLAME SECURITY SWEDEN AB, Skogås (SE)

(*) Notice: Subject to any disclaimer, the term of this patent is extended or adjusted under 35 U.S.C. 154(b) by 0 days.

(21) Appl. No.: 14/430,582

(22) PCT Filed: Sep. 29, 2013

(86) PCT No.: PCT/SE2013/000150
§ 371 (c)(1),
(2) Date: Mar. 24, 2015

(87) PCT Pub. No.: WO2014/051486
PCT Pub. Date: Apr. 3, 2014

(65) Prior Publication Data
US 2015/0251034 A1    Sep. 10, 2015

(30) Foreign Application Priority Data

Sep. 30, 2012  (SE) ................................. 1230103
Sep. 30, 2012  (SE) ................................. 1230104

(51) Int. Cl.
*A62D 1/00* (2006.01)
*C09K 21/12* (2006.01)

(52) U.S. Cl.
CPC ........... *A62D 1/0035* (2013.01); *A62D 1/005* (2013.01); *C09K 21/12* (2013.01)

(58) Field of Classification Search
None
See application file for complete search history.

(56) References Cited

U.S. PATENT DOCUMENTS

| | | | |
|---|---|---|---|
| 4,382,884 A | 5/1983 | Rohringer et al. | |
| 4,839,065 A * | 6/1989 | Vandersall | A62D 1/0064 106/14.05 |
| 4,971,728 A * | 11/1990 | Vandersall | A62D 1/0064 106/14.05 |
| 4,983,326 A * | 1/1991 | Vandersall | A62D 1/0064 106/14.05 |
| 5,162,394 A * | 11/1992 | Trocino | C08G 12/46 523/179 |
| 6,989,113 B1 * | 1/2006 | Mabey | C09K 21/04 106/18.16 |
| 2003/0141081 A1 * | 7/2003 | Clark | A62D 1/0085 169/48 |
| 2005/0017222 A1 | 1/2005 | Dermeik et al. | |
| 2006/0138391 A1 | 6/2006 | Drewes et al. | |
| 2006/0208236 A1 * | 9/2006 | Gang | C09D 5/185 252/601 |
| 2007/0289752 A1 * | 12/2007 | Beck | A62D 1/0035 169/47 |
| 2010/0181084 A1 | 7/2010 | Carmo | |

(Continued)

FOREIGN PATENT DOCUMENTS

| | | |
|---|---|---|
| CN | 101397501 A | 4/2009 |
| CN | 101555408 A | 10/2009 |
| CN | 102319499 A | 1/2012 |
| DE | 3833977 A1 | 4/1990 |
| EP | 1 065 309 A1 | 1/2001 |
| GB | 2433938 A | 7/2007 |
| WO | WO-2008/040101 A1 | 4/2008 |
| WO | WO-08040101 A1 | 4/2008 |
| WO | WO-2011/016773 A1 | 2/2011 |

(Continued)

OTHER PUBLICATIONS

European Search Report dated Jun. 20, 2016 issued in PCT International Patent Application No. PCT/SE2013/000150.

(Continued)

*Primary Examiner* — Joseph D Anthony
(74) *Attorney, Agent, or Firm* — Harness, Dickey and Pierce, P.L.C.

(57) ABSTRACT

The present invention discloses a composition and the use of the same in fire control applications. The composition comprises a compound of Formula I or any negatively charged deprotonated form thereof or mixtures thereof, a compound of Formula IIa or IIb or any positively charged or tautomeric form thereof or mixtures thereof and a booster. The booster is selected from the group consisting of a hydrophobic component, an amphiphilic component, a rheology modifier and any mixture thereof. Methods for production are also disclosed.

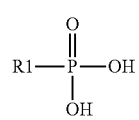

(I)

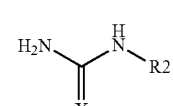

(IIa)

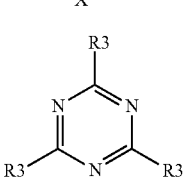

(IIb)

11 Claims, No Drawings

(56) References Cited

U.S. PATENT DOCUMENTS

2014/0093742 A1* 4/2014 Saari .................. B27K 3/08
428/541

FOREIGN PATENT DOCUMENTS

| WO | WO-2011/042481 A1 | 4/2011 |
| WO | WO-2012/105903 A1 | 8/2012 |

OTHER PUBLICATIONS

International Search Report and Written Opinion dated Mar. 14, 2014 issued in PCT International Patent Application No. PCT/SE2013/000150.

* cited by examiner

AQUEOUS COMPOSITION COMPRISING PHOSPHOROUS AND NITROGEN FOR GENERAL FIRE CONTROL

PRIORITY STATEMENT

This application is a national stage application under 35 U.S.C. § 371 of PCT International Application No. PCT/SE2013/000150 which has an international filing date of 29 Sep. 2013 and claims priority under 35 U.S.C. § 119 to Sweden Application No. 1230103-2 filed 30 Sep. 2012 and Sweden Application No. 1230104-0 filed 30 Sep. 2012. The contents of each application recited above are incorporated herein by reference in their entirety.

TECHNICAL FIELD

The present invention relates to an aqueous composition for use in fire control applications, for fire extinguishing and as flame retardant.

BACKGROUND

Two general principles for the repression of the harm and seriousness of burning combustible materials include: (i) the lowering of the materials tendency to kindle by treatment with a suitable composition, e.g. impregnation with a flame retardant, and (ii) extinguishing of the fire with a suitable liquid, solid or gaseous composition. Examples of the composition according to (i) include compositions containing e.g. organic phosphorous containing compounds, and according to (ii), e.g. bicarbonate, halogenated hydrocarbon and carbon dioxide containing compositions.

For a generally applicable fire-extinguishing composition, it is desirable that the composition has additional fire retarding properties in accordance with the first (i) general principle above. The reason for this is to be found in the mechanisms by which a fire spreads and re-ignites. A fire spreads by ignition of the material adjacent to the burning material, either by direct contact with the flames or indirectly by the heat radiation. Re-ignition is often caused, as in the case of e.g. re-ignition of e.g. a liquid petroleum fuel or oil, by local heating above the flash point caused by heat radiation or direct contact with a hot object or material. Hence, if the materials tendency to kindle is lowered by the fire-extinguishing composition, the spreading of the fire is inhibited and the extinguishing of the same facilitated. Furthermore, when the flames have been put out, the chances of subsequent re-ignition are diminished in comparison to the case of employment of fire-extinguishing means which are lacking additional fire retarding properties.

Additional desirable properties of a generally applicable fire-extinguishing composition, beside its effectiveness as flame retardant and fire extinguisher, include low toxicity, low environmental impact, low cost of composing constituents, easy preparation and handling, e.g. by firefighters, high stability enabling long term storage without decomposition and/or physical changes, e.g. precipitation, of the composition, suitable physicochemical properties, e.g. viscosity, density, tixotropy and lipophilicity, to allow facile and controlled application by e.g. the spraying through nozzles and/or pumping through fire-hoses, suitable physicochemical properties to allow effective fire-extinguishing of burning liquid hydrocarbons.

An additional desirable property of a generally applicable fire-extinguishing composition is a suitable pseudoplasticity or thixotropy to maximize the adhesion of the composition to the material adjacent to the burning material.

The most well known and used fire-extinguishing composition, which fulfills many of the above mentioned desired properties, is common water. When used in fire-fighting, water contacts burning objects which results in sufficient cooling such that the burning objects fall below their combustion or ignition temperatures, and new ignition is precluded. In addition, when water contacts hot objects, the water vaporizes to produce steam, which expands and expels the air necessary for combustion.

However, when a fire is extinguished by spraying water on the fire, only a part of the sprayed water is effective because of water loss, such as by run-off or evaporation. In addition, water is not suitable for the fire-fighting of burning liquid hydrocarbons, e.g. gasoline, as the generated steam causes an explosion-like increase and spread of the flames.

In order to improve the properties of water in flame proofing and fire-fighting applications, additives such as fire retarding chemicals, which may retard combustion for at least brief periods even after the water has evaporated, as well as having a direct fire-extinguishing effect, are being developed and are presently in use. Additional additives include, for example, thickening agents and different foam forming agents. Various forms of organic and inorganic phosphorous containing compounds represent commonly used fire retarding chemicals.

WO2011016773 A1 describes a composition comprising an organic phosphorous containing compound, an oil and a detergent for use in fire control applications. The phosphorous containing compound is a compound in which phosphorous is covalently bonded to nitrogen in the form of an amidoalkylphosphonic acid. Furthermore, in specific embodiments the amidoalkylphosphonic acid is provided as an ammonium chloride complex, which is previously described in EP1065309 A1. Disadvantages of the amidoalkylphosphonic acids essential for the composition disclosed in WO2011016773 A1 include a relatively high cost of production in comparison to e.g. the other components of the composition. Furthermore, the presence of chloride in exemplified embodiments is undesired in respect of toxicological and environmental factors.

WO2012105903 A1 describes a composition comprising an organic phosphorous containing compound and a rheology modifier. The phosphorous containing compound is a compound in which phosphorous is covalently bonded to nitrogen in the form of an amidoalkylphosphonic acid. Furthermore, in specific embodiments the amidoalkylphosphonic acid is provided as an ammonium chloride complex, which is previously described in EP1065309 A1. Disadvantages of the amidoalkylphosphonic acids essential for the composition disclosed in WO2012105903 A1 include a relatively high cost of production in comparison to e.g. the other components of the composition. Furthermore, the presence of chloride in exemplified embodiments is undesired in respect of toxicological and environmental factors.

Hence, improved aqueous formulations useful for fire fighting, including fire extinguishing and fire proofing, is desirable.

SUMMARY OF THE INVENTION

It is an object of the present invention, to provide a generally applicable fire-extinguishing composition with a lower cost of production in comparison to present compositions with similar applicability.

It is another object of the present invention, to provide a generally applicable fire-extinguishing composition for solid materials.

It is another object of the present invention, to provide a composition which is effective both as flame retardant and fire extinguisher.

It is another object of the present invention, to provide a composition which effectively prevents ignition of solid material adjacent to burning material.

It is another object of the present invention, to provide a composition which is effective as fire extinguisher and/or flame retardant and which simultaneously has a maximized adhesion to a surface onto which it has been applied.

It is another object of the present invention, to provide a generally applicable fire-extinguishing composition with a lower environmental or toxicological negative impact in comparison to present compositions with similar applicability.

It is another object of the present invention, to provide a generally applicable fire-extinguishing composition with a lower environmental or toxicological negative impact and a lower cost of production, with a similar or improved efficacy, in comparison to present compositions with similar applicability.

One or several of above objects and other objects, which will appear from the following description, have now been achieved by an aqueous composition comprising a compound of Formula I or any negatively charged deprotonated form thereof or mixtures thereof, a compound of Formula IIa or IIb or any positively charged or tautomeric form thereof or mixtures thereof

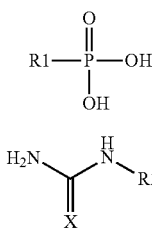

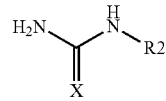

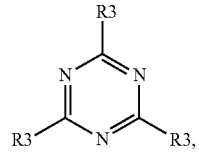

and a booster, wherein R1 is OH or $C_{1-6}$ alkyl, such as e.g. methyl; R2 is H or C(=X)NH$_2$; X is independently selected from O and N; R3 is independently selected from NH$_2$ and OH;
the booster is selected from the group consisting of a hydrophobic component, an amphiphilic component, a rheology modifier and any mixture thereof; the composition is comprising 1 to 10% by weight of the sum of said compound of Formula I or negatively charged deprotonated form thereof, 0.5 to 15% by weight of the sum of said compound of Formula IIa or IIb or positively charged or tautomeric form thereof; the hydrophobic component is selected from the group consisting of paraffinic oils, alkanes or alcohols comprising 8 to 40 carbon atoms and esters between glycerin and long chain carboxylic acids comprising 8 to 30 carbon atoms, and any mixture thereof; the amphiphilic component is a surfactant selected from the group consisting of anionic-, cationic-, zwitterionic-, nonionic amphiphilic surfactants, and any mixture thereof; and the rheology modifier is a polysaccharide.

According to one aspect, the booster may essentially be constituted by the hydrophobic component and the amphiphilic component. The composition may comprise 0.015 to 1.7% by weight of the hydrophobic component and 0.0165 to 2% by weight of the amphiphilic component. Such a composition is suitable, but not limited to, fire fighting of burning liquid hydrocarbons, e.g. burning gasoline.

According to another aspect, the booster may essentially be constituted by the rheology modifier, such as e.g. a polysaccharide such as e.g. xanthan gum. The composition may comprise 0.01 to 3% by weight of the rheology modifier. Such a composition has sticking properties, i.e. it has a tendency to form a stable layer on the surface of solid materials. Hence, it is suitable for, but not limited to, fire fighting of burning solid constructions, in particular constructions made of wood or other cellulose containing materials.

According to another aspect, the booster may essentially be constituted by the amphiphilic component. Such a composition has penetrating properties, i.e. it has a tendency to penetrate into e.g. cracks, porous constructions and soil. Hence, it is suitable for, but not limited to, fire fighting of forest fires and burning vegetation. The composition may further comprise a colorant, whereby the user more easily may be able to detect where the composition has been spread.

According to another aspect, the composition may further comprise a compound of Formula III, which may exist in a neutral or protonated positively charged form

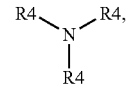

wherein R4 is independently selected from the group consisting of H, $C_{1-6}$ alkyl, which C1-6 alkyl may be further independently substituted with hydroxyl and $C_{1-6}$ fluoroalkyl. Advantages of the presence of a compound of Formula III include the increased ability to simultaneously maintain a desirable pH and ratio between phosphorous and nitrogen, i.e. a P—N-ratio, in the composition.

According to another aspect, the pH of the composition may be in the range from 6 to 10, such as e.g. 6.5 to 9 or preferably 6.5 to 8. Such a pH range may allow a more optimal long term stability of the composition and a minimized negative effect, such as e.g. corrosion, of any container, such as e.g. a metallic container, in which the composition is stored. Furthermore, it may be less hazardous when accidently contacting a users skin in comparison to the case when the composition has a lower or higher pH. Other advantages include a minimized chemical decomposition of other ingredients in the composition, such as e.g. a rheology modifier in the form of a polysaccharide, whereby the long term stability of the composition is increased.

According to another aspect, the ratio in the composition between the weight of the total phosphorous content and the weight of the total nitrogen content, i.e. the P—N-ratio, may be in the range from 0.1 to 0.6, preferably from 0.1 to 0.45. Such a ratio provides an optimal performance of the composition in fire control applications.

According to another aspect, the negatively charged form of the compound of Formula I may be a salt form in which salt form the corresponding counter ion is essentially a singularity or plurality of positively charged forms of the group of elements or compounds selected from the group consisting of Li, Na, K, ammonia, compounds of Formula IIa, compounds of Formula IIb, compounds of Formula III and mixtures thereof. Such counterions enable production of the present composition by employment of readily available chemicals with a relatively low cost and with a minimized risk of causing undesired interaction between these and other components of the composition, e.g. the booster, or with the material which is to be treated, e.g. gasoline.

Further features of the invention and its embodiments are set forth in the appended claims.

DETAILED DESCRIPTION

Several embodiments of the present invention will be described in more detail below with reference to the accompanying formulas in order for those skilled in the art to be able to carry out the invention. The invention may, however, be embodied in many different forms and should not be construed as limited to the embodiments set forth herein. Rather, these embodiments are provided so that this disclosure will be thorough and complete, and will fully convey the scope of the invention to those skilled in the art. The embodiments do not limit the invention, but the invention is only limited by the appended patent claims. Furthermore, the terminology used in the detailed description of the particular embodiments illustrated in the accompanying formulas is not intended to be limiting of the invention.

It was surprisingly found that the composition according to the invention constitute an excellent general fire fighting composition with fire extinguishing and fire retarding properties.

With "fire fighting", "fire-extinguish" or simply "extinguish" with reference to flames or fire, or the like, is to be understood herein a treatment which puts out the flames of a fire. With "flame proofing", "fire proofing", "flame retardation", "fire retardation", or the like, is to be understood herein a treatment which lowers a materials tendency to kindle, such as, for example, impregnation.

The aqueous composition of the invention essentially comprise a compound of Formula I or any negatively charged deprotonated form thereof or mixtures thereof, a compound of Formula IIa or IIb or any positively charged or tautomeric form thereof or mixtures thereof,

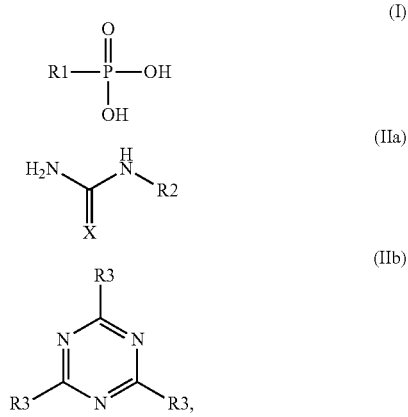

and a booster. R1 may be selected from OH or $C_{1-6}$ alkyl, such as methyl. R2 may be H or $C(=X)NH_2$, wherein X is independently selected from O and N. R3 may be independently selected from $NH_2$ and OH. The booster may be selected from the group consisting of a hydrophobic component, an amphiphilic component, a rheology modifier and any mixture thereof. Depending on the particular application, the composition of the booster may vary. For example, the booster may comprise essentially only a rheology modifier, essentially only a hydrophobic component in combination with an amphiphilic component or essentially only an amphiphilic component. Suitable applications for compositions comprising these examples of boosters include, but are not limited to, general fire fighting of burning constructions comprising e.g. wood or cellulose, fire fighting of burning liquid hydrocarbons, e.g. gasoline, and fire fighting of burning vegetation, grass and forests, respectively. The composition may comprise 1 to 10% by weight of the sum of the compound of Formula I or negatively charged deprotonated form thereof, 0.5 to 15% by weight of the sum of the compound of Formula IIa or IIb or positively charged or tautomeric form thereof. The hydrophobic component may be selected from the group consisting of paraffinic oils, alkanes or alcohols comprising 8 to 40 carbon atoms and esters between glycerin and long chain carboxylic acids comprising 8 to 30 carbon atoms, and any mixture thereof or the like. The amphiphilic component is a surfactant which may be selected from the group consisting of anionic-, cationic-, zwitterionic-, nonionic amphiphilic surfactants, and any mixture thereof and the like. The rheology modifier may be a polysaccharide like e.g. xanthan gum or the like.

According to one embodiment, the booster of the present composition may be constituted by a combination of a hydrophobic component and a an amphiphilic component. Hence, the composition of the invention may comprise a compound of Formula I, a compound of Formula IIa or IIb, a hydrophobic component and an amphiphilic component, dissolved or dispersed in water. R1 may be OH or $C_{1-6}$ alkyl, such as e.g. methyl. R2 may be H or $C(=X)NH_2$, such as e.g. $C(=O)NH_2$ or $C(=N)NH_2$. X of Formula IIa may be O or N. R3 may be $NH_2$ or OH in any combination. The composition may comprise 1 to 10%, such as 5 to 10%, by weight of the compound of Formula I, 0.5 to 15%, such as 8 to 15%, by weight the compound of Formula IIa or IIb, 0.015 to 1.7%, such as 0.5 to 1.7%, by weight of the hydrophobic component, and 0.0165 to 2%, such as 0.5 to 2%, by weight of the amphiphilic component.

According to one embodiment, the booster of the present composition may be essentially an amphiphilic component. Hence, the composition of the invention may comprise a compound of Formula I, a compound of Formula IIa or IIb and an amphiphilic component, dissolved or dispersed in water. R1 may be OH or $C_{1-6}$ alkyl, such as e.g. methyl. R2 may be H or $C(=X)NH_2$, such as e.g. $C(=O)NH_2$ or $C(=N)NH_2$. X of Formula IIa may be O or N. R3 may be $NH_2$ or OH in any combination. The composition may comprise 1 to 10%, such as 5 to 10%, by weight of the compound of Formula I, 0.5 to 15%, such as 8 to 15%, by weight the compound of Formula IIa or IIb, 0.0165 to 2%, such as 0.5 to 2%, by weight of the amphiphilic component.

According to one embodiment, the booster of the present composition may be essentially a rheology modifier. Hence, the composition of the invention may comprise a compound of Formula I, a compound of Formula IIa or IIb and a rheology modifier, dissolved or dispersed in water. R1 may be OH or $C_{1-6}$ alkyl, such as e.g. methyl. R2 may be H or $C(=X)NH_2$, such as e.g. $C(=O)NH_2$ or $C(=N)NH_2$. X of Formula IIa may be O or N. R3 may be NH$_2$ or OH in any combination. The composition may comprise 1 to 10%, such as 5 to 10%, by weight of the compound of Formula I, 0.5 to 15%, such as 8 to 15%, by weight the compound of Formula IIa or IIb and 0.01 to 3%, such as 0.01 to 1%, by weight of the rheology modifier.

The rheology modifier of the composition turns its viscosity to be dependent on shear rate and/or shear rate history. The non-Newtonian, e.g. tixotropic or pseudoplastic, properties of the composition, in combination with the compounds of Formula I, and IIa or IIb, are highly beneficial in fire-control applications. For example, when the disclosed composition is pumped through e.g. a nozzle towards a burning material, it attains a fluid like form and is easily and well spread. When it has reached the burning material, or objects adjacent to the burning material, it attains a stable gel like form and the tendency of the composition to run off the same or to be blown away by the wind is minimized. Hence, a highly effective flame retardation of the adjacent objects is achieved, whereby the fire is effectively hindered from spreading while it is simultaneously being extinguished.

Without being bound to any theory, the inventor believes that the relatively low viscosity of the composition, which is comprising a rheology modifier, at the time it is pumped through e.g. a nozzle or the like, is causing the formation of small drops which are well spread towards the burning material and/or adjacent material which is not yet burning but face a risk of being ignited. When these drops adhere to the burning material or the adjacent material, they form a film with a relatively high viscosity. Due to the relatively high viscosity, the film is well adhered to the material without running off and thereby effective as a flame retardant for material adjacent to burning material. The combination of the disclosed compositions fire extinguishing properties and the above described function as an effective flame retardant is advantageous in comparison to Newtonian fire extinguishing compositions of the prior art.

Non-limiting examples of compounds of Formula I are depicted in Scheme 1.

Scheme 1

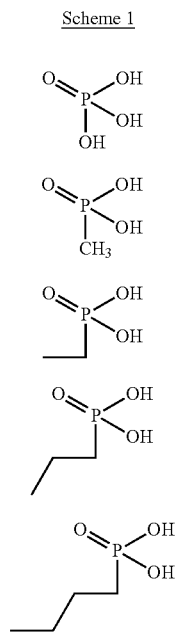

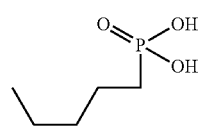

If

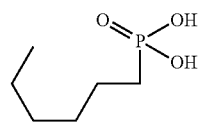

Ig

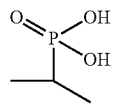

Ih

According to one embodiment, the compound of Formula I is Ia. Advantages of Ia include a readily availability, low cost and low toxicity.

According to one embodiment, R1 of Formula I is $C_{1-6}$ alkyl, preferably methyl.

Non-limiting examples of compounds of Formula IIa are depicted in Scheme 2.

Scheme 2

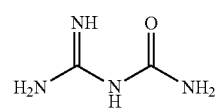

IIaa

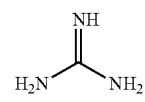

IIab

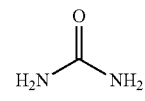

IIac

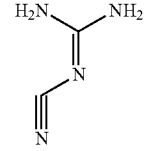

IIad

Non-limiting examples of compounds of Formula IIb are depicted in Scheme 3.

Scheme 3

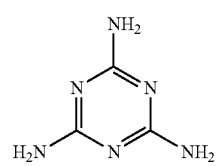

IIba

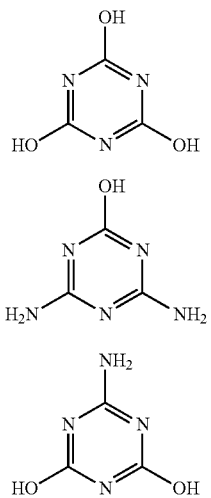

IIbb

IIbc

IIbd

Non-limiting examples of the hydrophobic component include paraffinic oils, of e.g. petroleum origin, mixtures of straight and/or branched and/or cyclic alkanes or alcohols, such as e.g. alkanes or alcohols with 8 to 40 carbon atoms, esters between glycerin and long chain carboxylic acids with 8 to 30 carbon atoms, which may be liquid at ambient temperature and comprise one or several double bonds, or mixtures of such esters, which may be liquid at ambient temperature, including e.g. oils of vegetable origin or cooking oils.

According to one embodiment, the hydrophobic component may be baby oil, such as the baby oil "mjukt & skönt" from AB Gunry in Kungsbacka, Sweden.

According to one embodiment, the hydrophobic component may comprise at least one, such as all, of the compounds selected from the group consisting of Paraffinium liquidium, cetyl alcohol or any similar long chain alcohol, glycine soya oil and olus oil.

According to one embodiment of the invention, the hydrophobic component may be massage oil.

According to one embodiment, the hydrophobic component may be an oil of vegetable origin with relatively low toxicity such as coconut oil, corn oil, cottonseed oil, olive oil, palm oil, peanut oil, rapeseed oil, safflower oil, sesame oil, soybean oil, sunflower oil, amaranth oil, apricot oil, apple seed oil, argan oil, artichoke oil, avocado oil, babassu oil, ben oil, borneo tallow nut oil, yangu oil, cocklebur oil, cohune oil, dika oil, false flax oil, flax seed oil, grape seed oil, hemp oil, kapok seed oil, marula oil, meadowfoam seed oil, mustard oil, okra seed oil, papaya seed oil, perilla seed oil, poppyseed oil, prune kernel oil, quinoa oil, ramtil oil, rice bran oil and tea seed oil.

According to one embodiment, the hydrophobic component may be an oil of vegetable origin such as castor oil, coconut oil, cottonseed oil, palm oil, peanut oil, radish oil, rapeseed oil, rice bran oil, safflower oil, salicornia oil, sunflower oil, tung oil, copaiba, honge oil, jatropha oil, jojoba oil and petroleum nut oil.

According to one embodiment, the hydrophobic component may be a cooking oil such as, for example, olive oil, sunflower oil, safflower oil, canola oil, soybean oil, peanut oil, sesame oil, corn oil, mustard oil, palm oil, grape seed oil, almond oil, and walnut oil.

According to one embodiment, the hydrophobic component may be rapeseed oil or sunflower oil. Advantages of such oils include their readily availability, low cost and low toxicity.

The amphiphilic component may typically comprise one or several of anionic-, cationic-, zwitterionic- and nonionic amphiphilic surfactants of a type and in proportions well known in the art to yield an efficacious, low-toxic and relatively environmentally benign emulsifier of oil-in-water emulsions, such as in e.g. commercially available dishwashing detergents. The anionic surfactant may be, for example, a sulphate, e.g. sodium dodecyl- or lauryl sulphate or ammonium lauryl sulphate; a sulphonate, e.g. perfluorooctanylsulphonate or various alkyl benzene sulphonates; and a carboxylate, e.g perfluorooctanoate, and various fatty acid salts or soaps. The cationic surfactant may be, for example, a quarternary ammonium salt such as an alkyl trimethylammonium salt, e.g. cetyl trimethylammonium bromide, or a pyridinium salt, e.g. cetylpyridinium chloride. Zwitterionic surfactants include, for example, CHAPS, betaine derivatives like cocamidopropyl betaine and dodecyl betaine, and cocoyl glycinates. Examples of nonionic amphiphilic surfactants include suitably substituted, e.g. alkylated, poly(ethylene oxides), Triton X-100, copolymers of ethylene oxide and propylene oxide, suitably substituted, e.g. alkylated, glucosides such as octyl glucoside and decyl maltoside, long chain alcohols, e.g. cetyl alcohol and oleyl alcohol, fatty acid amides like cocamide, sorbitol derived compounds like esters of sorbitan and PEG-ylated sorbitan.

According to one embodiment, the amphiphilic component of the composition may be a commercially available fabric softener.

According to one embodiment, the amphiphilic component of the composition may be a commercially available liquid or dry dishwashing detergent.

According to one embodiment, the amphiphilic component of the composition may be a commercially available liquid dishwashing detergent, such as YES® or Fairy® from Procter & Gamble.

According to one embodiment, the amphiphilic component may comprise at least one, such as all, of the compounds of Formula IVa, IVb, IVc and IVd, wherein n1 may be 8 to 14, such as 10, m1 may be 2 to 4, such as 2, n2 may be 8 to 14, such as 11, m2 may be 2 to 6, such as 4, n3 may be 8 to 14, such as 11 and n4 may be 8 to 14, such as 11.

Scheme 4

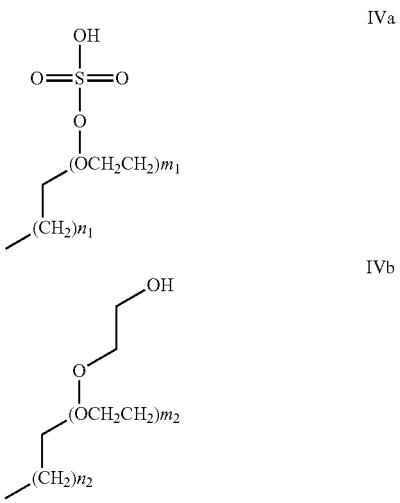

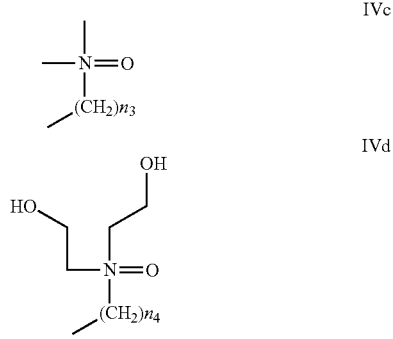

According to one embodiment, the amphiphilic component may comprise a mixture of the compounds of Formula IVa, IVb and IVc, or corresponding salts, constituting 50 wt-% or more of the amphiphilic component, with the relative proportions by weight of 3 to 6:0.2 to 1:1 to 2, respectively.

According to one embodiment, the amphiphilic component of the composition may be one or several of Hydravance 100®, Natrasense AG-810® and Crodasinic LS300 from Croda Nordica AB, Sweden.

According to one embodiment, the amphiphilic component of the composition may comprise at least one surfactant and optionally additional ingredients commonly used in detergents as well known in the art, e.g. compounds that modify foaming properties, sultaine surfactant hydrotropes, corrosion inhibitors and preservatives, e.g. N-alkylisothiazolinone and/or chlorinated derivatives thereof.

According to one embodiment of the invention, the rheology modifier of the composition may be selected from the group consisting of tixotropy enhancing or pseudoplasticity enhancing polysaccharides known in the art. The rheology modifier may also be any other organic or inorganic compound as known in the art with a tixotropy enhancing or pseudoplasticity enhancing effect similar to the tixotropy enhancing or pseudoplasticity enhancing effect of a suitable polysaccharide, such as xanthan gum.

According to one embodiment of the invention, the rheology modifier of the composition may be xanthan gum. Advantages of xanthan gum include its readily availability, low cost and low toxicity.

The composition may comprise a compound of Formula III,

wherein R4 is independently selected from the group consisting of H, $C_{1-6}$ alkyl, such as e.g. methyl and ethyl, and $C_{1-6}$ fluoroalkyl, such as e.g. a fluoroalkyl group comprising 1 to 13 fluoro, such as 3 to 5 fluoro. The $C_{1-6}$ alkyl may be further substituted with hydroxyl, whereby the compound of Formula III may be e.g. triethanolamin. Advantages of the presence of a compound of Formula III include the increased ability to simultaneously maintain a desirable pH and ratio between phosphorous and nitrogen, i.e. a P—N-ratio, in the composition. For example, a compound of Formula I may bias the composition towards an undesirable low pH, which may not be increased enough towards a desirable range by the presence of compounds of Formula IIa or IIb with only weakly basic properties. Partial substitution of the compounds of Formula IIa or IIb with only weakly basic properties for a compound of Formula III, may thus generate a compound of Formula III in a protonated positively charged form by an acid-base reaction while a desirable pH and P—N-ratio is achieved. The exact amount of the partial substitution is dependant on factors such as e.g. the acidity of the compound of Formula I, the alkalinity of the compounds of Formula IIa and IIb, the desired final pH and P—N-ratio of the composition, as readily understood and calculated by the skilled artisan. In addition, the compound of Formula III may carry additional functional groups or elements, e.g. fluorine of alkylfluoro, which are beneficial for the efficacy or performance of the composition.

It is well known to the skilled person that compounds of Formula I, IIa and IIb may have basic or acidic properties, i.e. that they may exist as salts or undergo acid-base reactions in aqueous solution, whereby they get protonated or deprotonated and may thus exist in a negatively or positively charged form. The artisan is also well aware of that some of these compounds may exist in different tautomeric and mesomeric forms. Although the compounds of Formula I, IIa and IIb are drawn herein in a particular tautomeric, mesomeric and neutral form, it is readily understood by the skilled person that corresponding tautomeric and mesomeric forms exist. It is further readily understood that e.g. a corresponding salt may be used in various cases instead of the neutral form when preparing a composition according to the invention. For example, a salt, such as e.g. an alkali metal salt or an ammonium salt, of a compound of Formula Ia or Ib may be used instead of a compound of Formula Ia or Ib in the form drawn herein, followed by subsequent pH adjustment of the resulting composition by addition of e.g. a strong acid such as e.g. sulphuric acid, to yield a composition according to the invention. When, in such cases, the corresponding ammonium salt is used as substitute, the skilled artisan will realize that the amount of, in first hand, the compound of formula III, and secondly, the compound of Formula IIa or IIb, will have to be reduced in order to achieve the desired P—N-ratio and pH as described herein.

Table 1 shows suitable combinations of ingredient and corresponding relative amounts to furnish compositions of the invention, according to embodiments which correspond to the entries therein.

According to one embodiment, a hydrophobic component may be added to the various combinations as represented by entries in Table 1. This hydrophobic component may, for example, be the baby oil "mjukt & skönt" from AB Gunry in Kungsbacka, Sweden, or any other suitable hydrophobic component as disclosed herein. The amount of the hydrophobic component may be 0.1 to 0.2 wt-% for entries 1 to 11, 0.5 to 1 wt-% for entries 12 to 22 and 1 to 1.7 wt-% for entries 23 to 26. Also, an amphiphilic component may be added to the various combinations as represented by entries in Table 1. The amphiphilic component of these combinations may, for example, be the liquid dishwashing detergent YES® or Fairy® from Procter & Gamble, or any other suitable amphiphilic component as disclosed herein. The amount of the amphiphilic component may be 0.14 to 0.4 wt-% for entries 1 to 11, 0.5 to 2 wt-% for entries 12 to 22 and 1.5 to 2 wt-% for entries 23 to 26. The combination of both of a hydrophobic component and an amphiphilic component together with the other ingredients as listed in Table 1, may provide a composition of the invention suitable for, for example, fire extinguishing of burning liquid hydrocarbons. The combination of an amphiphilic component together with the other ingredients as listed in Table 1, may provide a composition of the invention suitable for, for example, fire fighting of burning forests and vegetation due to its inherent penetrating properties.

According to one embodiment, the composition according to the entries of Table 1 may comprise 0.01 to 3%, such as 0.1 to 1% or preferably 0.5 to 1%, by weight of the composition, of a rheology modifier, such as e.g. xantan gum. Such compositions become non-Newtonian and may thus be beneficially used in various fire-control applications as well known in the art and as explained herein.

According to one embodiment, the ingredients of the various entries of Table 1 may be combined with an amphiphilic component in combination with a rheology modifier, such as e.g. xanthan gum, in proportions as disclosed in other entries herein. Advantages of such combinations include compositions with non-Newtonian and penetrating properties, which may be highly beneficial in various fire-fighting applications.

Dependant on the acidic and basic properties of the constituting components of the composition, e.g. compounds of Formula I, IIa and IIb, the pH of the composition may be relatively low or high. Although the composition may be effective in many applications independent of this pH, it is often desirable to adjust the pH thereof to a range from 6 to 10, such as 7 to 9. A composition with such a pH may have a minimal negative effect, such as corrosion, of the container it is stored in. Furthermore, chemical decomposition, such as e.g. hydrolysis of esters or amides, of other constituents, such as e.g. the lipophilic component or the amphiphilic component may be minimized, thus leading to improved long term storage ability. The pH of the composition may be increased to reside within the desirable range by addition of an appropriate chloro and bromo free base such as a compound of Formula III, as described elsewhere herein. Non-limiting examples of other appropriate bases that may be used for this purpose, which will not affect the P—N-ratio, include alkali metal hydroxides or carbonates, e.g. sodium- or potassium hydroxide or carbonate. The pH of the composition may be decreased to reside within the desirable range by addition of an appropriate chloro and bromo free acid. Non-limiting examples of such appropriate acids that may be used for this purpose, which will not affect the P—N-ratio, include sulphuric acid or organic acids such as e.g. formic, acetic, lactic or citric acid. The pH of the compositions disclosed in e.g. Table 1, entry 1, 2, 12 and 13, with a relatively high content within the range of compounds of Formula IIa, may advantageously be decreased to below 10 or below 9 by addition of an acid.

According to one embodiment, the P—N-ratio, i.e. the ratio between the total weight of phosphorous and nitrogen in the composition may be 0.1 to 0.6, such as e.g. 0.1 to 0.45. When the composition comprises a compound of Formula IIa as the main nitrogen containing component, the P—N-ratio may preferably be 0.1 to 0.3, more preferred 0.1 to 0.2. When the composition comprises a compound of Formula IIb as the main nitrogen containing component, the P—N-ratio may preferably be 0.3 to 0.6, more preferred 0.5 to 0.6. The composition may be considered to contain a compound of Formula IIa or IIb as the main nitrogen containing component when more than 60%, such as more than 70, 80 or 90%, of the total weight of nitrogen in the composition is covalently bound in the compound of Formula IIa or IIb, respectively.

The composition may be produced by adding, in a suitable order, the compound of Formula I, or any salt thereof such as e.g. the mono- or di-sodium or ammonium salt, the compound of Formula IIa or IIb, or any salt thereof such as e.g. a carbonate or sulphate salt when applicable, the hydrophobic component and/or the amphiphilic component and/or the rheology modifier to water, followed by mixing or stirring to provide a homogenous solution or dispersion, to provide an intermediate mixture having a first pH. The pH of this intermediate mixture, having a first pH, may then be adjusted to a second pH which is lower than the first pH by addition of an acid, or to a second pH which is higher than the first pH by addition of a base. Non-limiting examples of suitable acids include, for example, sulphuric acid, boric acid and organic acids such as formic, acetic, lactic and citric acid. Non-limiting examples of suitable bases include, for example, alkali metal, magnesium, aluminum and zinc hydroxides and carbonates. The base may be an amine of Formula III, such as aqueous ammonia or triethanolamine. Advantages of aqueous ammonia include a readily availability and low cost. Furthermore, the addition of an amine of Formula III may simultaneously set the P—N-ratio and the pH of the composition to a more optimal value, as described herein.

TABLE 1

| Entry # | Compound according to Formula I (wt-%) R1 is OH or methyl | Compound according to Formula IIa (wt-%) X is N and R2 is C(=O)NH2 | X is N and R2 is H | X is O and R2 is H | Formula IIb (wt-%) R3 is NH2 | R3 is OH | Formula III (wt-%) R4 is H |
|---|---|---|---|---|---|---|---|
| 1 | 1 | 2 to 6 | | | | | |
| 2 | 1 | | 1.5 to 5 | | | | |
| 3 | 1 | | | 1.5 to 5 | | | |
| 4 | 1 | | | 1.5 to 5 | | | 2 to 4 |
| 5 | 1 | | | | 0.5 to 2 | | |
| 6 | 1 | | | | 0.5 to 2 | | 2 to 4 |
| 7 | 1 | | | | | 1.5 to 4 | |
| 8 | 1 | | | | | 1.5 to 4 | 2 to 4 |
| 9 | 1 | 1.5 | | 0.5 to 5 | | | |
| 10 | 1 | 2 | | 1 to 4.5 | | | |
| 11 | 1 | | 1 to 1.5 | 1 to 6 | | | |
| 12 | 5 | 10 to 15 | | | | | |
| 13 | 5 | | 8 to 15 | | | | |
| 14 | 5 | | | 8 to 15 | | | |
| 15 | 5 | | | 8 to 15 | | | 10 to 20 |
| 16 | 5 | | | | 2.5 to 10 | | |
| 17 | 5 | | | | 2.5 to 10 | | 10 to 20 |

TABLE 1-continued

| | Compound according to Formula I (wt-%) | Compound according to Formula IIa (wt-%) | | | Compound according to Formula IIb (wt-%) | | Formula III (wt-%) |
|---|---|---|---|---|---|---|---|
| | | X is N and R2 is | X is N and R2 | X is O and R2 | | | |
| Entry # | R1 is OH or methyl | C(=O)NH2 | is H | is H | R3 is NH2 | R3 is OH | R4 is H |
| 18 | 5 | | | | | 7 to 15 | |
| 19 | 5 | | | | | 7 to 15 | 10 to 20 |
| 20 | 5 | 7.5 | | 2.5 to 15 | | | |
| 21 | 5 | 10 | | 5 to 15 | | | |
| 22 | 5 | | 5 to 6 | 6 to 15 | | | |
| 23 | 10 | | 15 | | | | |
| 24 | 10 | | | 15 | | | |
| 25 | 10 | | | | 5 to 15 | | |
| 26 | 10 | | | | | 15 | |

According to one embodiment, the ratio between the weight of the total phosphorous content and the weight of the total nitrogen content may be in the range from 0.1 to 0.3 while at least 60% of the total weight of nitrogen in said composition is covalently bound in said compound of Formula IIa.

According to one embodiment, the composition may be produced by: (i) adding the compound of Formula I, or any negatively charged deprotonated form thereof or mixtures thereof and the compound of Formula IIa or IIb, or any positively charged or tautomeric form thereof or mixtures thereof to water, followed by mixing or stirring to provide a homogenous solution or dispersion, to provide an intermediate mixture having a first pH; (ii) adjusting the pH of the intermediate mixture to a second pH which is lower than said first pH by addition of an acid, or adjusting the pH of said intermediate mixture to a second pH which is higher than said first pH by addition of a base; and (iii) adding the booster during step (i), between step (i) and step (ii) or after step (ii).

According to one embodiment, the present composition may be produced by adding the compound of Formula I and the compound of Formula IIa or IIb, in any order, to water, wherein the degree of protonation or salt forms of the compound of Formula I and the compound of Formula IIa or IIb is adapted such to provide an intermediate mixture with a first pH being on the acidic side, such as below pH 6, 5, 4 or 3. For example, the protonated form, i.e. the acid-form, of a compound of Formula I, and a salt form, such as e.g. the sulphate or hydrogensulphate of a compound of Formula IIa, may be added to water and dissolved or dispersed therein. The pH may then be adjusted to near neutral (pH 7), or to within a suitable range as disclosed herein, by addition of a base. Suitable bases may be selected from sodium- or potassium hydroxide or carbonate, ammonia, triethanolamine and the free base of a compound of Formula IIa or IIb. Compounds of Formula IIa and IIb, in particular compounds of Formula IIa, may preferably be used as base in the case when a P—N ratio which is lower than the corresponding P—N ratio which would have been obtained by the use of base not containing N, is preferred. The booster may be added at any point in the procedure, but preferably before the pH-adjustment, should it have a relatively strong general effect of the pH in aqueous solutions. Also, care should be taken to avoid addition of booster components to any solution with relatively low pH, should one or several of these components, such as a polysaccharide, be sensitive to such an environment.

According to one embodiment, an aqueous solution of a salt form of compound of Formula I may be used for the production of a composition of the present invention. Such an aqueous solution may be prepared by initial basic hydrolysis, by employment of e.g. sodium or potassium hydroxide, of a suitable mono- or diester, such as e.g. mono or di methyl or ethyl, of a compound of Formula I. The thereby formed alcohol may be distilled of from the aqueous solution during the hydrolysis. Before or after addition of the other components needed to provide the present composition, pH may be adjusted to be within a suitable interval, as described herein.

In fire fighting applications the composition may when comprising a suitable booster in the form of a hydrophobic component and an amphiphilic component, for example, be used for the extinguishing of fires in water immiscible flammable liquids, e.g. gasoline. In this application, the composition has an advantage that no or less increase of the intensity of the fire due to a steam explosion occurs, which is the case with the most common water or other water based compositions. In addition, the composition effectively prevents re-ignition of the flammable liquid once the fire has been put out by employment of the same.

The composition may, in particular when comprising a suitable booster in the form of a rheology modifier and/or amphiphilic component, be used for the extinguishing of fires in combustible solid materials for which conventional fire fighting means are presently employed including, for example, wood (e.g. forest fires), paper, textile, plastic materials, rubber, such as in car tires, and industrial waste. The composition may also be used for flame proofing of such combustible solid materials or other objects. For example, the composition may be sprayed towards objects, e.g. trees, houses, ships, airplanes or the like, which are adjacent to or near a fire to prevent the fire from spreading to these objects.

One advantage of the composition, in particular when comprising a suitable booster in the form of at least a rheology modifier, in comparison to other flame retarding agents of the prior art with regard to fire fighting of burning solid materials, for example wood and tree-based materials, is its excellent flame retarding properties upon direct administration by e.g. spraying. The suitable physicochemical properties of the composition, for example its relatively low viscosity when sprayed but relatively high viscosity when adhered, enables an even spread of the composition on the surface of the solid material without running of the same. The close and long contact with the solid material then enables e.g. the phosphorous containing compound of the disclosed composition to effectively penetrate and flame proof the material.

Examples of solid materials, of which the flames when burning may be extinguished with the composition of the invention, include wood, trees, sawdust, paper, textile, house-refuse and industrial waste.

According to one embodiment, the herein mentioned solid materials may be flame proofed by treatment with the composition according to the invention.

Additional burning flammable liquids which may be extinguished by employment of the present composition, when comprising a suitable booster in the form of a hydrophobic component and an amphiphilic component, include water miscible organic liquids like methanol, ethanol and acetone, and mixtures of these with each other or petroleum products like, for example, gasoline.

Without being bound to theory, the inventor believes that the compositions ability to inhibit ignition or re-ignition of a flammable liquid, which has a temperature near its flash point, is due to the diminished tendency of that liquid, in comparison to the same liquid which has not been treated with the composition, to emit flammable gases.

The composition may also be used for the extinguishing of fires in other combustible materials for which conventional fire fighting means are presently employed including, for example, wood (e.g. forest fires), paper, textile and industrial waste.

One advantage of the composition in particular when comprising a suitable booster in the form of at least a rheology modifier, with regard to fire fighting of burning solid materials, for example wood and tree-based materials, is its excellent flame retarding properties upon direct administration by e.g. spraying In one non-limiting fire-fighting application according to one embodiment, the composition in particular when comprising a suitable booster in the form of at least a rheology modifier, may be used to pre-treat, by e.g. spraying, materials or objects in order to flame proof these. Such materials and objects include, for example, houses located near a raging fire and trees located near a raging forest-fire. The physicochemical properties of composition, which is making the composition facile to spread in an effective way, is advantageous in this application.

Examples of liquids, of which the flames when burning may be extinguished with the composition of the invention, include water immiscible organic solvents that are liquids at room temperature, organic solvents that are partly soluble in water and liquids at room temperature, combustion- and reaction-engine fuels and related hydrocarbons like e.g. gasoline and kerosene, water miscible organic liquids and solvents like methanol, ethanol and acetone, vegetable oils that are liquids at room temperature like cooking oils used for e.g. deep-frying of food.

Examples of semisolids, such as greases, gums or other at room temperature amorphous materials, of which the flames when burning may be extinguished with the composition of the invention, include fat of animal origin such as bacon-fat, grease of petroleum or synthetic origin such as lubricating grease, rubber such as in car tires, and tars such as e.g. wood-, coal-, shale- and refined tars.

Examples of solids, of which the flames when burning may be extinguished with the composition of the invention, include wood, trees, sawdust, paper, textile, house-refuse and industrial waste.

According to one embodiment, the herein above mentioned liquids, semisolids and solids may be flame proofed by treatment with the composition according to the invention.

The constituents of the composition according to the invention are either commercially available products, available at a low cost, or easily prepared from cheap commercially available chemicals.

The relative proportions of the constituting ingredients, e.g the compounds of Formula I and Formula IIa or IIb, the hydrophobic component, the amphiphilic component and the rheology modifier, of the composition according to the invention may be varied so that a composition which is optimal for the particular fire fighting or fire retarding application is obtained, as well known to the skilled person. For example, the physical properties, e.g. the viscosity, may be fine-tuned by varying the relative proportions of the constituting ingredients to generate the desired drop-size and/or stream-shape as the composition is discharged through a particular nozzle, or other type of outlet, used in the application of the same.

Furthermore, the selection of the constituting ingredients within the scope of the invention may be chosen such that a composition which is optimal for the particular fire fighting or fire retarding application is obtained, as well known to the skilled person. For example, the combination of a particular compound of Formula I and IIa or IIb, rheology modifier, preservative, hydrophobic component and amphiphilic component may be chosen to optimize the stability of the composition so that no or minimal precipitation, or any other physical change, occurs upon storage of the composition in e.g. reservoirs at sites, like airports or gas stations, where readily available fire fighting capabilities are desired. Another example include the choice of a suitable dyestuff as an additional additive for the fire fighting of e.g. forest fires, whereby treated areas are easily spotted, as known in the art.

According to one embodiment of the invention, additional additives of the composition of the present invention comprise, for example, suitable magnesium-, aluminum-, zink-, and calcium salts, known in the art to have a fire retarding effect, including, for example, magnesium hydroxide, aluminum hydroxide, zinc hydroxystannate, calcium cyanamide, zinc cyanamide, boric acid, zinc borate and other boric acid salts. Such additives may also be used to increase or decrease the final pH of the composition when having alkaline or acidic properties, respectively, as well known to the skilled person. One or several of these additives may further enhance the fire protecting properties of the composition according to the invention.

According to one embodiment of the invention, additional additives of the composition of the present invention comprise, for example, heat or light stabilizers, lubricants, film-forming agents, plasticizers, colorants, pigments, dyestuffs, hydrophilizing agents, hydrophobizing agents and thickeners. Such additives may further enhance the stability, the fire fighting capability, the ease of spotting where the composition has been applied, and improve the physicochemical properties of the composition to be more optimal for the particular application. The selection of a particular one of these additives for the enhancement or improvement of a given property, is known to the one skilled in the art.

According to one embodiment of the invention, an additional additive of the composition of the present invention may be a foam forming agent, as well known in the art, which results in the generation of, for example, an aqueous film forming foam, an alcohol-resistant aqueous film forming foam, and a film formed from fluoroproteins.

According to one embodiment of the invention, an additional additive of the composition of the present invention may be an anti-freeze agent such as ethylene- or propylene glycol.

According to one embodiment of the invention, an additional additive of the composition of the present invention may be a thixotropy enhancing agent as known in the art, i.e. an additive which will increase the tendency of the composition to a attain a stable gel like form at rest but to become more fluid-like when agitated. Such a property is beneficial in certain applications related to fire extinguishing or flame proofing of e.g. solid materials as it decreases the compositions tendency to run off the same.

According to one embodiment of the invention, the composition of the invention may be used as the main active fire fighting component in an active fire protection device. Such an active fire protection device may be a hand held or cart-mounted fire extinguisher used to extinguish or control small fires. A suitable propellant, for example nitrogen, air, or carbon dioxide, may be used.

According to one embodiment, the composition may be used for fire extinguishing or fire retardation of fires of fire class A, according to the European or American classification system.

According to one embodiment, the composition may be used for fire extinguishing or fire retardation of fires of fire classes A, B and F, according to the European classification system.

According to one embodiment, the composition may be used for fire extinguishing or fire retardation of fires of fire classes A, B and K, according to the American classification system.

According to one embodiment, the composition may be used for fire control of a liquid including, for example, water immiscible organic solvents that are liquids at room temperature, organic solvents that are partly soluble in water and liquids at room temperature, combustion- and reaction-engine fuels and related hydrocarbons like e.g. gasoline and kerosene, water miscible organic liquids and solvents like methanol, ethanol and acetone, and vegetable oils that are liquids at room temperature like cooking oils used for e.g. deep-frying of food.

According to one embodiment, the composition may be used for fire control of a solid including, for example, wood, trees, sawdust, paper, textile, house-refuse and industrial waste.

According to one embodiment, the composition may be used for fire control of a semisolid including, for example, fat of animal origin such as bacon-fat, grease of petroleum or synthetic origin such as lubricating grease, rubber such as in car tires, and tars such as e.g. wood-, coal-, shale- and refined tars.

According to one embodiment of the invention, the composition may comprise 0.01 to 3% by weight of a rheology modifier selected from the group consisting of tixotropy enhancing or pseudoplasticity enhancing polysaccharides known in the art. The rheology modifier may also be any other organic or inorganic compound as known in the art with a tixotropy enhancing or pseudoplasticity enhancing effect similar to the tixotropy enhancing or pseudoplasticity enhancing effect of a suitable polysaccharide, such as xanthan gum. Advantages of compositions comprising such a rheology modifier include the higher ability to stick to materials adjacent to burning material without running off, thus providing a protective effect against ignition of the former.

According to one embodiment of the invention, the rheology modifier of the composition may be xanthan gum. Advantages of xanthan gum include its readily availability, low cost and low toxicity.

According to one embodiment of the invention, the composition may comprise at least one preservative with e.g. antibacterial and antifungal effects to increase the long term storage capabilities of the composition at e.g. 20 to 30° C. to at least e.g. one year. Examples of suitable preservatives include N-alkylisothiazolinones such as e.g. 2-methyl-2H-isothiazol-3-one, chlorinated N-alkylisothiazolinones such as e.g. 5-chloro-2-methyl-2H-isothiazol-3-one, ethylparaben, benzalkonium chloride, 2-bromo-2-nitropropane-1,3-diol, or the like. The composition may comprise 0.01 to 0.5% by weight of such a preservative.

According to one embodiment of the invention, the composition may comprise 2-methyl-2H-isothiazol-3-one or 5-chloro-2-methyl-2H-isothiazol-3-one as preservative.

According to one embodiment of the invention, the composition may comprise a mixture of 2-methyl-2H-isothiazol-3-one and 5-chloro-2-methyl-2H-isothiazol-3-one, such as in commercially available Kathon CG® or as a mixture in the range from 1:99 to 99:1 by weight, respectively, as preservative.

According to one embodiment of the invention, there is provided an aqueous composition comprising 0.01 to 0.5%, such as 0.04 to 0.1%, by weight of a preservative selected from the group consisting of 2-methyl-2H-isothiazol-3-one, 5-chloro-2-methyl-2H-isothiazol-3-one, and a mixture of 2-methyl-2H-isothiazol-3-one and 5-chloro-2-methyl-2H-isothiazol-3-one.

According to one embodiment of the invention, the composition may comprise 1 to 10% by weight of a compound of Formula I wherein R1 is OH or Me, 0.5 to 15% by weight of the sum of a compound of Formula IIa or IIb, such as urea or guanidine, 0.01 to 1% by weight of commercially available xanthan gum, and 0.04 to 0.1%, by weight of a commercially available mixture of 2-methyl-2H-isothiazol-3-one and 5-chloro-2-methyl-2H-isothiazol-3-onem, such as an 1:3 mixture.

In the claims, the term "comprises/comprising" does not exclude the presence of other elements or steps. Furthermore, although individually listed, a plurality of means, elements or method steps may be implemented by e.g. a single unit or processor. Additionally, although individual features may be included in different claims, these may possibly advantageously be combined, and the inclusion in different claims does not imply that a combination of features is not feasible and/or advantageous. In addition, singular references do not exclude a plurality. The terms "a", "an", "first", "second" etc do not preclude a plurality. Reference signs in the claims are provided merely as a clarifying example and shall not be construed as limiting the scope of the claims in any way.

The invention claimed is:

1. An aqueous composition comprising a compound of Formula I or any negatively charged deprotonated form thereof or mixtures thereof, a compound of Formula IIa or IIb or any positively charged or tautomeric form thereof or mixtures thereof,

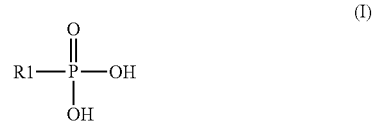

(I)

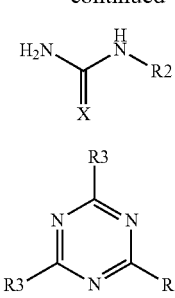

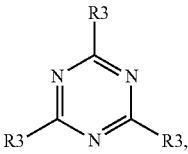

and a rheology modifier comprising a polysaccharide, wherein

R1 is OH or $C_{1-6}$ alkyl;
R2 is H or $C(=X)NH_2$;
X is independently selected from O and N;
R3 is independently selected from $NH_2$ and OH;
said composition comprising:
1 to 10% by weight of the sum of said compound of Formula I or negatively charged deprotonated form thereof,
0.5 to 15% by weight of the sum of said compound of Formula IIa or IIb or positively charged or tautomeric form thereof, and
0.01 to 3% by weight of said rheology modifier;
and wherein the pH is in the range from 6.5 to 9.

2. A composition according to claim 1, further comprising a compound of Formula III in a neutral or protonated positively charged form,

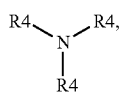

wherein
R4 is independently selected from the group consisting of H, $C_{1-6}$ alkyl, which $C_{1-6}$ alkyl may be further independently substituted with hydroxyl, and $C_{1-6}$ fluoroalkyl.

3. A composition according to claim 2, wherein said any negatively charged deprotonated form of a compound of Formula I is a salt form, in which salt form the corresponding counter ion is essentially a singularity or plurality of positively charged forms of the group of elements or compounds selected from the group consisting of Li, Na, K, ammonia, compounds of Formula IIa, compounds of Formula IIb, compounds of Formula III and mixtures thereof.

4. A composition according to claim 3, wherein said group of elements or compounds is selected from the group consisting of Na, K, compounds of formula IIa and mixtures thereof.

5. A composition according to claim 1, wherein R1 is OH or methyl.

6. A composition according to claim 1, wherein R1 is methyl.

7. A composition according to claim 1, wherein said rheology modifier is xanthan gum.

8. A composition according to claim 1, wherein the ratio between the weight of the total phosphorous content and the weight of the total nitrogen content is in the range from 0.1 to 0.45.

9. A composition according to claim 8, wherein the ratio between the weight of the total phosphorous content and the weight of the total nitrogen content is in the range from 0.1 to 0.3 and at least 60% of the total weight of nitrogen in said composition is covalently bound in said compound of Formula IIa.

10. A method for production of a composition according to claim 1, comprising the steps of:
(i) adding said compound of Formula I, or any negatively charged deprotonated form thereof or mixtures thereof and said compound of Formula IIa or IIb, or any positively charged or tautomeric form thereof or mixtures thereof to water, followed by mixing or stirring to provide a homogenous solution or dispersion, to provide an intermediate mixture having a first pH;
(ii) adjusting the pH of said intermediate mixture to a second pH which is lower than said first pH by addition of an acid, or adjusting the pH of said intermediate mixture to a second pH which is higher than said first pH by addition of a base; and
(iii) adding said rheology modifier during step (i), between step (i) and step (ii) or after step (ii).

11. A method according to claim 10, wherein the degree of protonation or salt forms of said compound of Formula I and said compound of Formula IIa or IIb is adapted such to provide said intermediate mixture with said first pH being below pH 6; and increasing the pH of said intermediate mixture by addition of a base selected from the group consisting of an alkali metal hydroxide or carbonate, a free base of said compound of Formula III and a free base of said compound of formula IIa.

* * * * *